(No Model.)

F. H. RICHARDS.
AUTOMATIC WEIGHING MACHINE.

No. 535,728.

3 Sheets—Sheet 1.

Patented Mar. 12, 1895.

Witnesses:
J. L. Edwards Jr.
Fred. J. Dole.

Inventor
F. H. Richards (No Model.) 3 Sheets—Sheet 2.

F. H. RICHARDS.
AUTOMATIC WEIGHING MACHINE.

No. 535,728. Patented Mar. 12, 1895.

Witnesses:
J. L. Edwards Jr.
Fred. J. Dole.

Inventor:
F. H. Richards (No Model.) 3 Sheets—Sheet 3.
F. H. RICHARDS.
AUTOMATIC WEIGHING MACHINE.
No. 535,728. Patented Mar. 12, 1895.
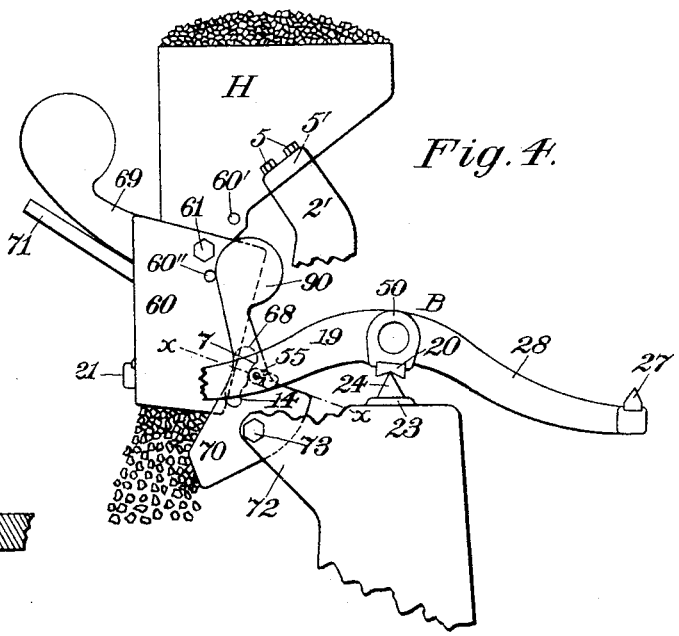
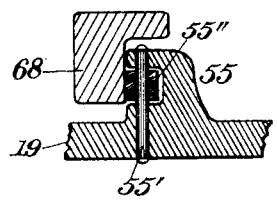
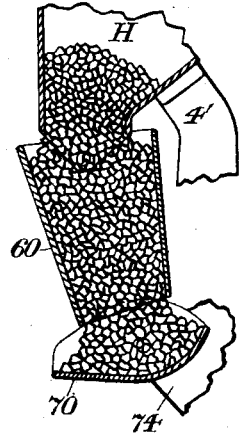
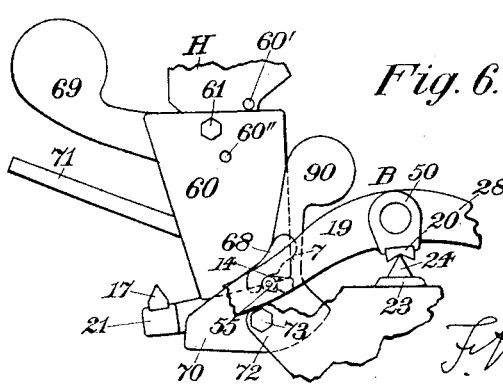
Witnesses
J. L. Edwards Jr.
Fred. J. Dole,
Inventor:
F. H. Richards

UNITED STATES PATENT OFFICE.

FRANCIS H. RICHARDS, OF HARTFORD, CONNECTICUT.

AUTOMATIC WEIGHING-MACHINE.

SPECIFICATION forming part of Letters Patent No. 535,728, dated March 12, 1895.

Application filed July 18, 1894. Serial No. 517,876. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Automatic Weighing-Machines, of which the following is a specification.

This invention relates to that class of automatic weighing-machines which are operated by the power or weight of the material being weighed.

The invention has for its object to furnish an automatic scale or weighing-machine provided with an improved valve-mechanism, whereby the machine will be adapted for weighing granular materials of irregular size, and especially such materials as the smaller sizes of anthracite coal having mixed therein lumps of coal of relatively large size, and for weighing meal, feed, cement and like granular materials the particles of which are normally of small size, but which, in practice, are more or less lumpy and therefore apt to clog the valves of ordinary weighing-machines.

For the purpose of illustrating the nature and practical operation of my present invention, I have shown the same in connection with a double-bucket, automatic, weighing-machine, the principal features of which are shown and described in prior Letters Patent granted to myself and others, and which are, for convenience, hereinafter briefly described.

Figure 1:
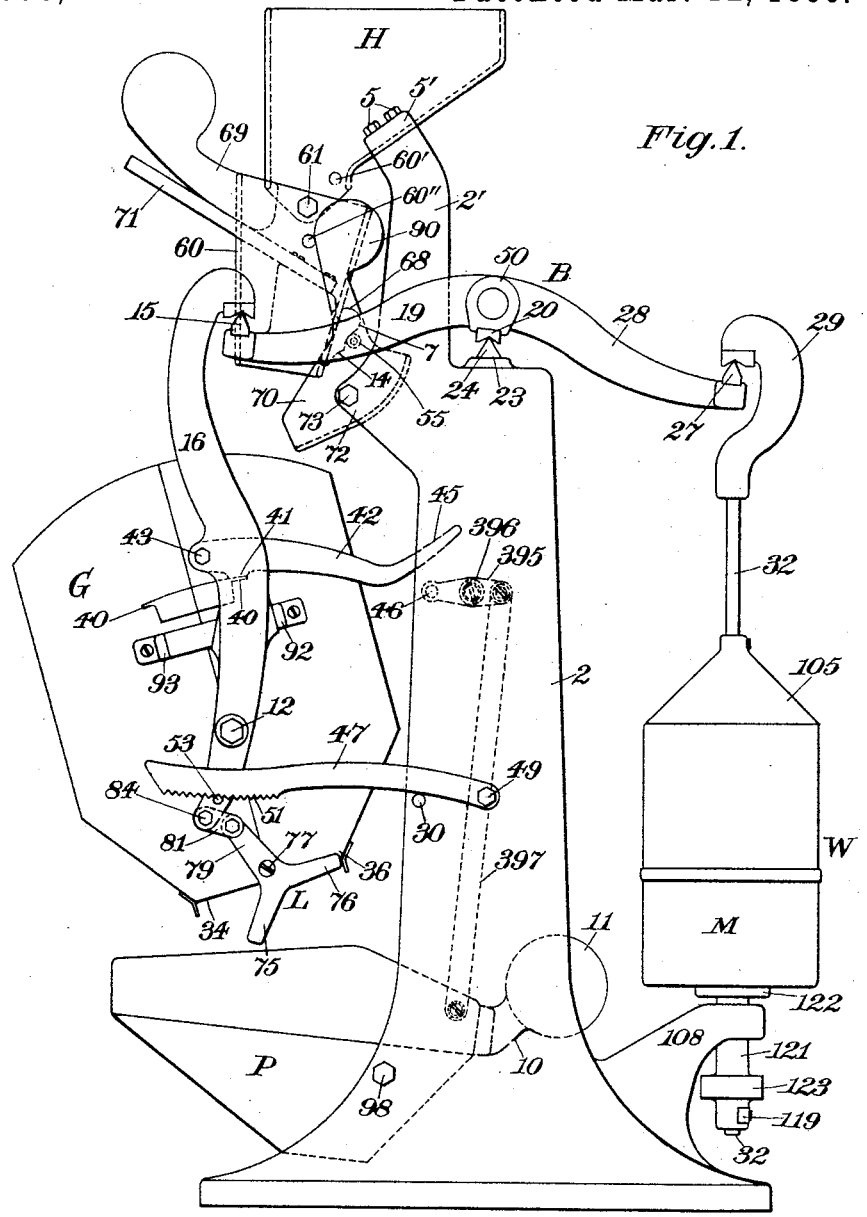
Figure 2:
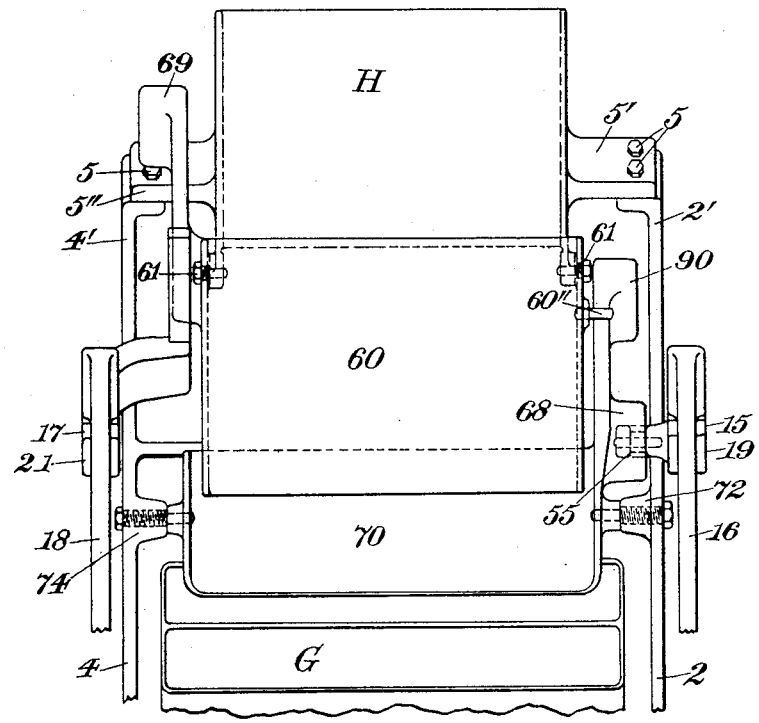
Figure 3:
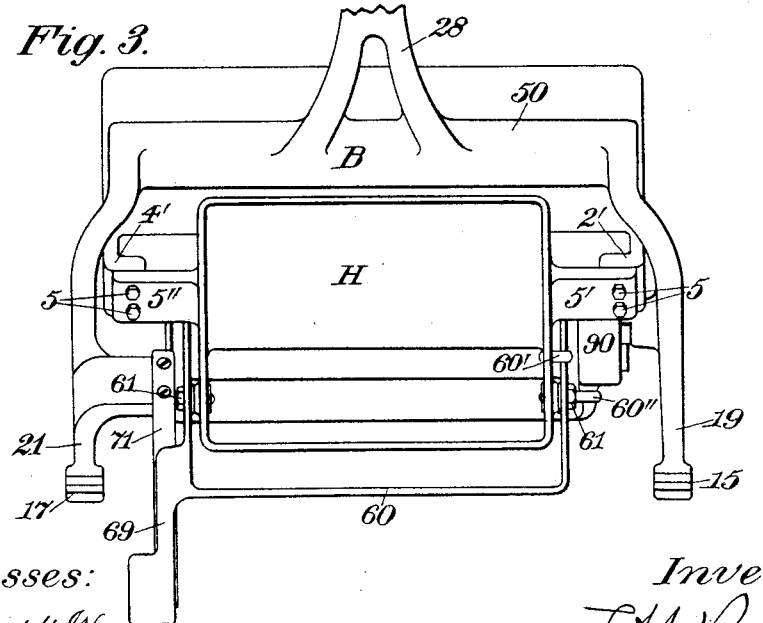

In the drawings accompanying and forming a part of this specification, Figure 1 is a side elevation of an automatic weighing machine embodying my present improvements. Fig. 2 is a front elevation of the upper front portion thereof. Fig. 3 is a plan of the upper, front portion thereof. Figs. 4, 5 and 6 are elevation details illustrating the successive stages of the operation from the beginning of movement of the loaded bucket to the discharge of the contents thereof. Fig. 7 is a sectional detail in line $x$—$x$, Fig. 4, on an enlarged scale, and Fig. 8 is a longitudinal, sectional view corresponding to Fig. 6.

Similar characters designate like parts in all of the figures.

The framework for carrying the operative parts of this machine usually, and as shown in the drawings, comprises two side frames or uprights 2 and 4, having vertical extensions 2' and 4', upon which the supply-chute H is secured by means of bolts 5, passing through the projecting arms 5' and 5'', preferably integral with said chute.

The double-chambered bucket G is journaled at 12 in bearings formed in the hangers 16 and 18, which are suspended by V-shaped bearings on the pivots or knife-edges 15 and 17, respectively, of the principal arms 19 and 21 of the scale-beam B. This beam has V-shaped bearings, one at each end of the hollow shaft 50 thereof, only one of said bearings 20 being shown. These bearings rest on pivots or knife-edges suitably supported, as by bearings on the framework. One of said knife-edges is shown at 24 and its bearing at 23. Opposite to arms 19 and 21 an arm 28 extends rearwardly from the scale-beam-shaft 50, and is provided with a pivot or knife-edge 27, on which a main weight such as W, (also designated as the "counterweight") is suspended by a hook 29. This weight is preferably made up of a lower main weight M, which should have a mass sufficient to balance the unloaded bucket, and a cylindrical cover 105, fitted to slide up and down on a suspension-rod 32, and containing suitable load-weights adapted to bring up the weight of the counter-poise to the weight of the load of coal or other material carried by the bucket. The construction and mode of operation of this counterpoise weight are fully set forth in my prior Letters Patent No. 442,720, granted December 16, 1890, to which reference may be had for a more particular description thereof. The stop shown herein for limiting the vertical movements of the counter-weight is also of the type shown and described in said Letters Patent. In the drawings this stop is shown as having the bracket 108, the rod 32, and the sleeve 121 fixed to said rod by the key 119, said sleeve having the upper stop-collar 122, and the lower stop-collar 123, formed thereon.

The bucket G, of the double-chambered type and having the discharge-spouts 34 and 36, is journaled at 12, as before stated, and the oscillation of said bucket is limited by suitable stops on each side thereof, of any of the well-known kinds, only one pair 92 and 93 being shown. The spouts 34 and 36 are alternately closed by a bucket-closer, such as L, which is pivotally-supported upon said bucket and is operated by a suitable connection with the hangers thereof. The form of closer herein shown consists of the two oppositely-disposed plates, or closers proper, 75 and 76, pivoted to the bucket G upon each side, one pivot 77 being shown. To the upper end of the arm 79 is pivoted one end of a link 81, the opposite end of which is pivoted at 84 to the lower end of the hanger 16. This construction is of course duplicated, though not shown in the drawings, for the opposite side of the bucket. The construction and mode of operation of this form of bucket-closer are more fully shown and described in detail in my prior patent, No. 442,713, granted December 16, 1890, to which reference may be had. For retaining the bucket in its forward and backward positions, respectively, I preferably employ the bucket-latch and stops described in my prior Letters Patent No. 447,354, granted March 3, 1891, to which reference is made for a detailed description thereof.

The detent apparatus is shown in the drawings, as comprising the bucket-latch or lever 42, which is pivoted at 43 to the hanger, and the projecting end 45 of which engages with a bucket-latch stop 46, carried on the framework in a normally-fixed position, but adapted to be shifted by the regulator hopper. The arm 42 carries a suitable detent-catch 41 adapted to engage with stops 40, which are secured to the side of the bucket in the usual manner. The rearward end 45 of the lever 42, is preferably of segmental form, being substantially concentric with the bucket-supporting knife-edges when the beam is at the poising point.

The ordinary regulator-hopper P is illustrated, pivotally supported below the bucket G within the main frame, one of the pivots being shown at 98. Said hopper is counterpoised by a weight 11, carried by an arm 10 fixed to said hopper, which is limited in its movements by suitable stops (not shown). Connecting-rods 397 extend from the rear of the hopper to the rearward ends of levers 395, which are pivoted to the framework at 396, and carry at their forward ends the bucket-latch stops 46, hereinbefore referred to, the arrangement being such as to throw the said stop out of the path of movement of the end of the bucket-latch arm 42 when the hopper is over-loaded.

For preventing undue swaying of the bucket and hangers I employ bucket detents 47 preferably the construction shown and described in Letters Patent No. 442,723, granted to C. H. Cooley, December 16, 1890, to which reference is made. Each of said detent-arms is shown as pivoted at 49 to the framework, and provided on its under side with detent teeth or notches 51, adapted to engage detent-pins 53, secured to the hangers. Stops 30 are also provided upon the framework to release the teeth from the said detent pins upon the descent of the loaded bucket.

The valve-mechanism for reducing and for cutting off the flow of the material to the bucket is actuated partly from and by the scale-beam, and partly by the force of the supply-stream, and comprises, in combination with the supply-chute, and with the scale-beam of the weighing-machine, a cut-off valve located below the chute and shown herein as of the swinging type, and a supply-stream controller located between the chute and the cut-off valve, and in operative relation with the scale-beam, and adapted for controlling the path of flow of the supply-stream, said stream-controller being continuously and progressively movable relatively to the valve during the period beginning with the commencement of the poising of the scale-beam and ending with the final cut-off of the stream by the cut-off valve, so that the trajectory of the supply-stream will be continuously and progressively varied relatively to said valve during said period and the flow of the supply-stream will be correspondingly varied. This stream-controller is shown in the form of a tubular or chute-valve, but may be any means which, co-operatively with the cut-off valve, will be capable of positively limiting the flow of the stream relatively to said valve without substantially modifying the stream issuing from the mouth of the supply-chute, and which means, by itself, will positively define the forward side of the flow-stream, and during the reducing period will also bring that portion of the forward side of the flow-stream which is immediately adjacent to the stream-supporting face of the cut-off valve toward and within the forward end of said face of said valve, and which means co-operatively with said cut-off valve, will constantly maintain the remaining side or sides of said flow-stream within the area of said cut-off valve.

The chute-valve or reducing-valve 60 is here shown as tubular in form and as pivoted to the sides of the main chute H at the points 61. The usual-weighted, actuating lever 69, is secured to said valve in the well known manner, and is actuated from the scale-beam by means of a valve-operating-arm 71. As will be seen by reference to the drawings, the reducing valve does not effect the regulation of the flow of the stream by partially closing the mouth of the supply-chute, but by closing over the cut-off valve 70, gradually actuating said cut-off valve to close the space between the two valves, and by simultaneously and progressively varying the trajectory, that is, the direction of flow of the stream. The variation of the trajectory of the said stream is effected partly by the valve-actuating-lever 69, but chiefly by the weight of the stream itself when the chute-valve is properly hung, so that the movement of the reducing valve will be more rapid than the corresponding movements of the reducing valves used upon prior, automatic weighing machines, for weighing grain and materials requiring a very fine regulation of the flow of the stream. It will be observed also, that there is no reduction of the flow-stream within the chute-valve itself and that the material normally issues, from the valve outlet in as great a volume as it does from the supply-chute.

The cut-off valve is shown as pivoted at 73 within the two arms 72 and 74 of the frame, and is provided with a weighted actuating lever, the said valve being preferably so hung upon its pivots that the weight of the lever is normally borne directly by the pivots and exerts no force to either side thereof. The cut-off valve actuating-lever carries upon its face and above its pivot a cam 68, having the upper and lower cam-faces 7 and 14, which are adapted to be engaged successively upon the downward movement of the scale-beam by the valve-actuator 55 mounted upon said beam.

Stops 60', shown as affixed to the sides of the chute H, are provided to limit the oscillation of the chute-valve, and said valve also carries upon its side an actuating-pin 60", in engagement with the weighted arm of the cut-off valve-lever 68.

As long as the weight of the loaded bucket is insufficient to move the scale-beam the valves and connected parts will remain in the position shown in Figs. 1 and 4. As soon as the load becomes sufficient to cause the descent of the forward end of the scale-beam, the chute-valve 60 is carried backward, partly by means of the valve-actuating-lever 69, controlled by the scale-beam arm, but principally by the weight and momentum of the stream and the impact thereof upon the rear wall of the valve,—and tends to rapidly close the space between the mouth thereof and the mouth of the cut-off valve. By the time the scale-beam has reached its poising point the supply stream has been reduced to a "drip" stream of small size shown in Fig. 5. The end of the poising movement is also the end of the movement of the chute-valve, as it is then engaged by the fixed stops 60' upon the supply-chute. When the swinging, chute-valve reaches this point, the trajectory of the stream is so altered that the impact weight and momentum thereof are not at once exerted directly upon the bucket, but upon the cut-off valve; and the said forces are then transmitted in a greatly reduced ratio to said bucket, owing to the decrease of the size of the stream and the shortening of the trajectory.

At the end of the poising movement the mouth of the tubular chute-valve covers the cut-off valve, said cut-off valve has been oscillated slightly upon its pivot by means of the actuating pin 60", and the actuator 55 has traveled down the upper cam-face 7 of the cam 68, until it has reached the midway point between the two cam faces, as shown in Fig. 5. The reduced or "drip" stream, issuing from the mouth of the cut-off valve will gradually bring the load in the bucket up to the desired weight during the latter part of the poising period, and as soon as the load in the bucket is sufficient to carry the scale-beam below its poising point the actuator 55 will be carried into the lower cam-face 14, whereupon, the center of gravity of the actuator being altered, the said respect to the actuator having previously been carried beyond valve having previously been carried beyond its pivotal point at 73, by the actuating pin 60", will quickly oscillate upon its axis and close sharply over the mouth of the chute-valve, cutting off the stream entirely as shown in Figs. 6 and 8. The axis of the cut-off valve movement passes through that portion of the mass sustained upon the valve, which is subjected, on the closing of the valve, to a non-progressive shifting-action upon itself, the vertical shifting movements of said mass being in opposite directions at opposite sides of the axis of said valve. During this action, which immediately precedes the shutting off of the flow, there is no discharge of material from the spout, but the force of the beam, which tends to close the valve, is augmented by the weight and momentum of the shifting mass upon the rear of the valve-blade, and the upward movement of the forward end of the valve is not correspondingly retarded by the material thereon, as said material spreads out readily upon the front end of the valve as soon as said valve begins to rise.

It will be observed that in my present improvements there is no reduction of the stream by the closing of a reducing valve across the mouth of a supply-chute, but that the reduction of the flow of the stream is obtained by varying the trajectory thereof and directing said flow against the inclined face of a part relatively, if not absolutely, fixed during said variation, that is, against the cut-off valve, also that the said cut-off valve, immediately upon the close of the poising movement and the continuation of the descent of the bucket, will cut off the drip-stream and close the mouth of the tubular-valve by a single movement. The return of the valves and connected devices is effected as usual by the counterpoise W, as soon as the bucket has been unloaded in the well known manner.

In order to avoid undue friction upon the moving parts I have shown the actuator 55 as provided with a bearing for a spindle or pin 55', carrying a friction roller 55", which travels upon the cam-faces.

The weighted actuating-lever of the tubular chute-valve normally tends to force said valve to the right, until the rear vertical edge thereof is substantially perpendicular to the poising line of the scale beam, and covers the rear position of the cut-off valve sufficiently far to properly distribute the weight of the material upon said valve, as shown in Fig. 8.

My present improvements are especially adapted for use in weighing all slow-running materials, and particularly for weighing the coal fed to boiler furnaces and thereby enabling the keeping of a continuous duty test for a boiler-plant, such as is not possible to obtain at present. A very simple and effective regulation of such a stream may be secured by the use of the tipping, cut-off valve, which controls with precision the cutting-off of the flow after the bucket has been filled, and by the use in connection therewith of the swinging tubular valve, controlling the trajectory of the falling mass and serving in connection with the cut-off valve to reduce the flow to a drip-stream, during the poising period, only sufficiently large to carry the scale beam past its poising point and thereby enable the force exerted upon the scale-beam and that exerted upon the rear of the cut-off valve to become effective to close said valve.

Moreover it is practicable, by means of my present improvements, to employ a relatively large chute-valve and cut-off valve in connection with a relatively small weighing-machine whereby lumpy and irregular materials may be weighed with great facility in relatively small quantities without clogging up the valves or having any detrimental effect upon their operation, a result unobtainable with the valves heretofore used and one which is of great practical value in the art.

Having thus described my invention, I claim—

1. In an automatic weighing-machine, the combination with a supply-chute; a scale-beam; and a cut-off valve located below said chute; of a supply-stream controller, substantially as described, located between said chute and valve, and in operative relation with said beam, for controlling the path of flow of the stream, and continuously and progressively movable relatively to said valve during the period beginning with the commencement of the poising of the beam and ending with the final cut-off of the stream, and adapted to continuously and progressively vary the trajectory of the supply-stream relatively to said valve during said period and to correspondingly vary the flow of the stream, as set forth.

2. In an automatic weighing-machine, the combination with a supply-chute; a scale-beam; and a cut-off valve located below said chute; of a supply-stream controller substantially as described, located between said chute and the valve, for controlling the path of flow of the stream, and connected and adapted to be controlled in part by the scale-beam and in part by the force of the supply-stream, and continuously and progressively movable relatively to said valve during the period beginning with the commencement of the poising of the beam and ending with the final cut-off of the stream, and adapted to continuously and progressively vary the trajectory of the supply-stream relatively to said valve during said period and to correspondingly vary the flow of the stream, as set forth.

3. In an automatic weighing-machine, the combination with a supply-chute; a scale-beam; and a swinging cut-off valve located below said chute; of a supply-stream controller substantially as described, located between said chute and the valve, for controlling the path of flow of the stream, and connected and adapted to be controlled in part by the scale-beam and in part by the force of the supply-stream, and continuously and progressively movable relatively to said valve during the period beginning with the commencement of the poising of the beam and ending with the final cut-off of the stream, and adapted to continuously and progressively vary the trajectory of the supply-stream relatively to said valve during said period and to correspondingly vary the flow of the stream, as set forth.

4. In an automatic weighing-machine, the combination, with a supply-chute, a scale-beam, and a cut-off valve, of a chute-valve in operative relation with said scale-beam and intermediate of said chute and cut-off valve and adapted on the descent of the scale-beam to continuously and progressively vary the trajectory of said stream relatively to the cut-off valve and thereby continuously and progressively decrease the flow of the stream, substantially as described.

5. In an automatic weighing-machine, the combination with a supply-chute, a scale-beam, and a swinging cut-off valve, of a chute-valve in operative relation with said scale-beam and intermediate of said chute and cut-off valve and adapted on the descent of the scale-beam to continuously and progressively vary the trajectory of said stream relatively to the cut-off valve and thereby continuously and progressively decrease the flow of the stream, substantially as described.

6. In an automatic weighing-machine, the combination with a supply-chute, and with a scale-beam, of a chute-valve in operative relation with the scale-beam and controlling the mouth of the said supply-chute, and adapted to continuously and progressively vary the trajectory of said stream, and a cut-off valve underlying said chute-valve and adapted to decrease the flow of the supply-stream proportionately to the variations of the trajectory of said stream and having a subsequent movement for closing the mouth of the chute-valve, substantially as described.

7. In an automatic weighing-machine, the combination with a supply-chute, and with a scale-beam, of a chute-valve in operative relation with said scale-beam and controlling the mouth of said supply-chute and adapted to continuously and progressively vary the trajectory of said stream, and a cut-off valve underlying said chute-valve and adapted to decrease the flow of the supply-stream proportionately to the variations of the trajectory of said stream and having a subsequent movement upon an axis passing transversely through that portion of the mass which is sustained by said cut-off valve whereby opposite non-progressive shifting movements are imparted to said mass at opposite sides of said axis and the cut-off of the flow is effected prior to the actual closure of said valve, substantially as described.

8. In an automatic weighing-machine, the combination with a supply-chute, and with a scale-beam, of a chute-valve in operative relation with said scale-beam and controlling the mouth of said supply-chute and adapted to continuously and progressively vary the trajectory of said stream, and a cut-off valve underlying said chute-valve and adapted to decrease the flow of the supply-stream proportionately to the variations of the trajectory of said stream and having a subsequent movement controlled in part by the descent of the beam and in part by the force of the supply-stream for closing the mouth of the chute-valve, substantially as described.

FRANCIS H. RICHARDS.

Witnesses:
 FRED. J. DOLE,
 EMMA G. FOWLER.